Figures 1, 2:
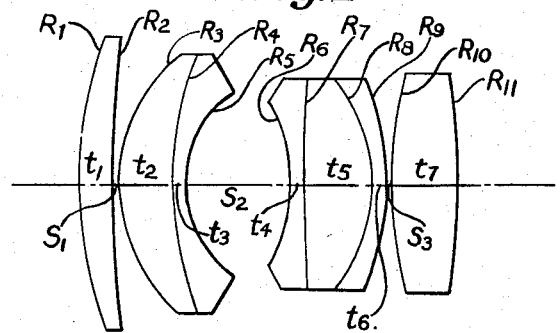

Sept. 23, 1952            W. SCHADE            2,611,295
OPTICAL OBJECTIVE COMPRISING A MENISCUS DOUBLET AND
MENISCUS TRIPLET BETWEEN TWO POSITIVE COMPONENTS
Filed June 14, 1951

| F = 100 mm | | | | f/1.4 |
|---|---|---|---|---|
| Lens | N | V | Radii | Thicknesses |
| 1 | 1.880 | 41.1 | $R_1 = +96.2$ mm<br>$R_2 = +303.$ | $t_1 = 8.73$ mm<br>$S_1 = 0.39$ |
| 2 | 1.697 | 56.1 | $R_3 = +41.5$<br>$R_4 = +90.2$ | $t_2 = 14.76$<br>$t_3 = 3.13$ |
| 3 | 1.673 | 32.2 | $R_5 = +28.5$ | $S_2 = 27.02$ |
| 4 | 1.751 | 27.7 | $R_6 = -43.8$<br>$R_7 = +531.$ | $t_4 = 3.95$<br>$t_5 = 17.70$ |
| 5 | 1.755 | 47.2 | $R_8 = -41.3$ | $t_6 = 3.95$ |
| 6 | 1.605 | 37.9 | $R_9 = -62.3$ | $S_3 = 0.39$ |
| 7 | 1.745 | 45.8 | $R_{10} = +118$<br>$R_{11} = -201$ | $t_7 = 17.31$<br>BF = 55.9 |

*Willy Schade*
INVENTOR.

Patented Sept. 23, 1952

2,611,295

UNITED STATES PATENT OFFICE 2,611,295

OPTICAL OBJECTIVE COMPRISING A MENISCUS DOUBLET AND MENISCUS TRIPLET BETWEEN TWO POSITIVE COMPONENTS

Willy Schade, Rochester, N. Y., assignor to Eastman Kodak Company, Rochester, N. Y., a corporation of New Jersey Application June 14, 1951, Serial No. 231,624

2 Claims. (Cl. 88—57)

This invention relates to photographic objectives.

The object of the invention is to provide a highly corrected objective particularly suitable for use in cinephotography at apertures up to about f/1.4.

The main advantage of the present lens over former lenses of f/1.5 or f/1.4 aperture and equivalent coverage is the highly improved correction of oblique spherical aberration commonly known as rim ray correction. Another advantage in comparison to some highly corrected known lenses of this type is the increased diaphragm space between the components permitting greater convenience in mounting a diaphragm and greater freedom in the adjustment of the spacing when the lens is finally assembled during manufacture.

A type of lens which has been found superior for use as a high aperture cinephotographic objective because of its comparatively long back focal distance and the high degree of correction of which it is capable consists of two compound negative meniscus components concave toward each other and axially aligned between two positive components. It is usual for the front positive component to be weakly concave toward the rear, that is its rear surface is concave with a radius of curvature greater than F where F is the focal length of the objective, and for the rear component to be biconvex, a plane surface being considered as the limiting form of convex surface having an infinite radius of curvature, when this type lens is adapted for cinephotography requiring a high aperture and a moderate field coverage of about ±15°. It is also usual for the concave surfaces of the negative components to be unequal in curvature, that of the third component being the less strongly curved.

As is customary, the front of the objective here and in the appended claims is defined as the end of the objective facing the longer conjugate (object or image).

According to the present invention an objective of this known type is made up in which the second component (counting from the front) consists of a meniscus positive element cemented to the front of a meniscus negative element, the cemented surface having a radius of curvature between ½F and 2F where F is the focal length of the objective and having negative power numerically between 0.01 and 0.05 times the power of the whole objective and in which the third component consists of a positive element cemented between two negative elements of which the rear element has a refractive index between 0.1 and 0.2 lower than the index of the positive element and is separated therefrom by a cemented surface having a radius of curvature between 0.3F and 0.55F. The large index difference at this surface has a strong corrective effect on the lower rim rays. The front cemented surface of this third component is much less strongly curved and has a radius of curvature numerically between 0.8F and ∞, inclusive. Because of the comparatively weak curvature and comparatively small angle of incidence of the image-forming rays, the index difference at this surface is much less critical than that at the rear cemented surface. In fact, this cemented surface is included in the lens structure primarily for color correction and has only a very minor effect on monochromatic aberrations. The dispersive index of the front element of this triplet component is preferably less than 0.75 times that of the positive element for complete color correction and may be as low as available materials permit, namely about 0.4 times that of the positive element. Its refractive index is determined by two considerations not fundamental to the invention, first that only a limited range of refractive indices (about 1.60 to about 1.85) is available in suitable high-dispersion materials and second that it is convenient (but not essential) in the design of the lens (as is true in optical systems generally) to have a substantially zero index-difference at a cemented surface introduced primarily for color correction, sometimes called a "buried surface."

For the best working of the invention, it is advantageous to make all the positive elements of glasses with refractive indices between 1.65 and 1.95. By "glass" is meant any homogeneous transparent material which is isotropic or no more birefringent than sapphire, a crystal which has been successfully used as an optical material.

The front component is preferably a simple element of glass having a refractive index higher than 1.80 and a dioptric power between 0.4 and 1.0 times that of the whole objective. I find that a high index in this position is very helpful in correcting the barrel distortion which tends to be present in this type of lens.

The rear component preferably has a dioptric power between 0.7 and 1.4 times that of the whole objective. This component is conveniently a simple positive element, but may be made up as a cemented doublet in known manner without departing from the spirit of the invention.

In a highly preferred form of the invention, a highly corrected objective is made up of a negative doublet and a negative triplet aligned between two positive singlets, in which the radii of curvature R and the refractive indices N, each numbered by subscripts from front to rear, are within the limits listed as follows:

$$0.8F < +R_1 < 1.2F$$
$$F < +R_2 < \infty$$
$$0.35F < +R_3 < 0.5F$$
$$0.7F < +R_4 < 1.3F$$
$$0.26F < +R_5 < 0.31F$$
$$0.38F < -R_6 < -0.5F$$
$$0.8F < \pm R_7$$
$$0.3F < -R_8 < 0.55F$$
$$0.5F < -R_9 < 0.8F$$
$$0.75F < +R_{10} < 2F$$
$$F < -R_{11} \leq \infty$$
$$1.80 < N_1 < 1.95$$
$$1.65 < N_2 < 1.80$$
$$0.01 < (N_2 - N_3) < 0.05$$
$$1.60 < N_4 < 1.85$$
$$1.70 < N_5 < 1.90$$
$$0.10 < (N_5 - N_6) < 0.20$$
$$1.65 < N_7 < 1.90$$

and in which the thickness of each negative element is between 0.01F and 0.06F and that of each positive element is between 0.05F and 0.25F, and in which the central space is between 0.2F and 0.35F and each of the other two spaces is between zero and 0.05F inclusive.

It will be noted that the indices $N_3$ and $N_6$ of two elements are each specified relative to the index of the element cemented thereto rather than relative to air. This is because the index difference at these cemented surfaces is more critical to the invention than the indices themselves.

In the accompanying drawing Fig. 1 shows, in diagrammatic axial section, an objective according to the invention and Fig. 2 gives constructional data for one specific example thereof.

The constructional data is repeated below for convenience:

[F = 100 mm. f/1.4]

| Lens | N | V | Radii | Thicknesses |
|---|---|---|---|---|
| | | | mm. | mm. |
| 1 | 1.880 | 41.1 | $R_1 = + 96.2$ | $t_1 = 8.73$ |
| | | | $R_2 = +303.$ | $s_1 = 0.39$ |
| 2 | 1.697 | 56.1 | $R_3 = + 41.5$ | $t_2 = 14.76$ |
| 3 | 1.673 | 32.2 | $R_4 = + 90.2$ | $t_3 = 3.13$ |
| | | | $R_5 = + 28.5$ | $s_2 = 27.02$ |
| 4 | 1.751 | 27.7 | $R_6 = - 43.8$ | $t_4 = 3.95$ |
| 5 | 1.755 | 47.2 | $R_7 = +531.$ | $t_5 = 17.70$ |
| 6 | 1.605 | 37.9 | $R_8 = - 41.3$ | $t_6 = 3.95$ |
| | | | $R_9 = - 62.3$ | $s_3 = 0.39$ |
| 7 | 1.745 | 45.8 | $R_{10} = +118.$ | $t_7 = 17.31$ |
| | | | $R_{11} = -201.$ | BF = 55.9 |

In this table the lens elements as numbered from front to rear are designated in the first column, the corresponding refractive indices N for the D line of the spectrum and the conventional dispersive indices V are given in the next two columns. The radii R of the lens surfaces, the thicknesses t of the lens elements and the spaces s between components, each numbered by subscripts from front to rear, are given in the last two columns, as is also the back focal distance BF, for an equivalent focal length F of 100 mm. It is commonly understood that data for longer or shorter focal lengths are obtained by multiplying all the values in the last two columns of the table by a constant greater or less than one, respectively.

It will be directly evident from the above table that this example embodies all the features of the invention hereinbefore described.

The spherical aberrations S. A. and Coma (defined as: $Y_1/\sin U'_k - F - S. A.$, where $Y_1$ is the distance between the axis and a designated incident ray parallel to the axis and $U'_k$ is the angle which the same ray makes with the axis after traversing the lens system) have been computed for the "g" spectral line as follows:

| | S. A. | Coma |
|---|---|---|
| f/1.4 | +0.19 | +0.04 |
| f/2.0 | -0.10 | -0.04 | showing very small zonal aberration. The axial color, paraxially computed, is $-0.09$ and the lateral color at 10° is $+0.006$ from the D line to the g line.

The distortion $\Delta Y$, the primary or tangential curvature $\Delta F'$ and the secondary or sagittal curvature $\Delta F''$ have been computed in the customary manner and have values as follows:

| Field Angle | $\Delta Y$ | $\Delta F'$ | $\Delta F''$ |
|---|---|---|---|
| 10° | -0.10 | -0.17 | -0.26 |
| 14° | -0.30 | -0.32 | -0.43 | for the "D" spectral line. The symbols $\Delta Y$, $\Delta F'$, and $\Delta F''$ are used because they designate increments in ray height (Y) and focal length (F) of an actual image point as compared with a theoretically ideal image point. The Petzval sum is $+0.0022$.

Four oblique rays at 10° and four at 14° have been computed in addition to the principal rays and were all found to strike the focal plane within $+0.083$ and $-0.173$ mm. of the principal ray, showing a very high degree of correction.

I claim:

1. A photographic objective consisting of two positive components and two compound negative meniscus components concave toward each other spaced between and axially aligned with the two positive components, in which each positive element as hereinafter enumerated has a refractive index between 1.65 and 1.95, in which the front component is weakly concave toward the rear and consists of a single positive lens element, in which the second component consists of a meniscus positive element cemented to the front of a meniscus negative element, the cemented surface having a radius of curvature between 0.5F and 2F and negative power numerically between 0.01P and 0.05P where F is the focal length and P the power of the objective as a whole, in which the third component consists of a positive element cemented between two negative elements of which the rear negative element has a refractive index between 0.1 and 0.2 lower than that of the positive element and of which the front negative element has a dispersive index between 0.4 and 0.75 times that of the positive element and a refractive index between 1.60 and 1.85, the rear cemented surface having a radius of curvature between 0.3F and 0.55F and the front cemented surface having a radius of curvature numerically between 0.8F and $\infty$ inclusive, in which the concave rear surface of the second component is more strongly curved than the concave front surface of the third component, and in which the rear or fourth component is biconvex and includes one positive element.

2. A photographic objective chromatically and spherically corrected and consisting of four axially aligned and airspaced components, the front and rear components being singlets, the second being a doublet and the third being a triplet, in which the radii of curvature R and the refractive indices N, each numbered by subscript from front to rear, are within the ranges defined by the following algebraic inequalities:

$$0.8F < +R_1 < 1.2F$$
$$F < +R_2 < \infty$$
$$0.35F < +R_3 < 0.5F$$
$$0.7F < +R_4 < 1.3F$$
$$0.26F < +R_5 < 0.31F$$
$$0.38F < -R_6 < -0.5F$$
$$0.8F < \pm R_7$$
$$0.3F < -R_8 < 0.55F$$
$$0.5F < -R_9 < 0.8F$$
$$0.75F < +R_{10} < 2F$$
$$F < -R_{11} \leq \infty$$
$$1.80 < N_1 < 1.95$$
$$1.65 < N_2 < 1.80$$
$$0.01 < (N_2 - N_3) < 0.05$$
$$1.60 < N_4 < 1.85$$
$$1.70 < N_5 < 1.90$$
$$0.10 < (N_5 - N_6) < 0.20$$
$$1.65 < N_7 < 1.90$$

and in which the thickness of each negative element is between 0.01F and 0.06F and that of each positive element is between 0.05F and 0.25F, and in which the central space is between 0.2F and 0.35F and each of the other two spaces is between zero and 0.05F inclusive, where F is the focal length of the objective.

WILLY SCHADE.

REFERENCES CITED

The following references are of record in the file of this patent:

UNITED STATES PATENTS

| Number | Name | Date |
|---|---|---|
| 1,779,257 | Lee | Oct. 21, 1930 |
| 2,186,621 | Bertele | Jan. 9, 1940 |
| 2,336,207 | Aklin | Dec. 7, 1943 |

FOREIGN PATENTS

| Number | Country | Date |
|---|---|---|
| 470,522 | Great Britain | Aug. 17, 1937 |
| 533,844 | Great Britain | June 8, 1943 |